United States Patent
Oh et al.

(10) Patent No.: US 10,249,919 B2
(45) Date of Patent: Apr. 2, 2019

(54) BATTERY CELL HAVING IMPROVED COOLING PERFORMANCE

(71) Applicant: LG Chem, Ltd., Seoul (KR)

(72) Inventors: Sei Woon Oh, Daejeon (KR); Eun Ju Lee, Daejeon (KR); Jung Ah Shim, Daejeon (KR); Seok Koo Kim, Daejeon (KR); Je Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/320,459

(22) PCT Filed: Jul. 16, 2015

(86) PCT No.: PCT/KR2015/007389
§ 371 (c)(1),
(2) Date: Dec. 20, 2016

(87) PCT Pub. No.: WO2016/027991
PCT Pub. Date: Feb. 25, 2016

(65) Prior Publication Data
US 2017/0229745 A1   Aug. 10, 2017

(30) Foreign Application Priority Data
Aug. 21, 2014   (KR) .................. 10-2014-0108718

(51) Int. Cl.
*H01M 10/643*   (2014.01)
*H01M 10/052*   (2010.01)
(Continued)

(52) U.S. Cl.
CPC ......... *H01M 10/643* (2015.04); *H01M 2/022* (2013.01); *H01M 2/0257* (2013.01);
(Continued)

(58) Field of Classification Search
CPC .............. H01S 3/06791; H01S 5/5018; H01S 3/08027; H01S 3/06754; H01S 3/106; H01S 3/1112
(Continued)

(56) References Cited

U.S. PATENT DOCUMENTS 4,262,064 A   4/1981   Nagle
5,187,030 A * 2/1993   Firmin ................ F28D 15/0275
                                                               429/120
(Continued)

FOREIGN PATENT DOCUMENTS

CN   102544577 A   7/2012
CN   103843185 A   6/2014
(Continued)

OTHER PUBLICATIONS

International Search Report from PCT/KR2015/007389, dated Sep. 22, 2015.

*Primary Examiner* — Gary D Harris
(74) *Attorney, Agent, or Firm* — Lerner, David, Littenberg, Krumholz & Mentlik, LLP

(57) ABSTRACT

Disclosed herein is a battery cell configured to have a structure in which an electrode stack, which is configured to have a structure in which positive electrodes and negative electrodes are stacked in the height direction on the basis of the ground in the state in which separators are disposed respectively between the positive electrodes and the negative electrodes, is mounted in a battery case in a sealed state, the battery case is formed in a pipe shape having a hollow part, and the electrode stack is formed in a shape corresponding to the shape of the battery case.

18 Claims, 4 Drawing Sheets

(51) Int. Cl.
*H01M 10/613* (2014.01)
*H01M 10/623* (2014.01)
*H01M 10/654* (2014.01)
*H01M 2/02* (2006.01)
*H01M 2/06* (2006.01)
*H01M 2/10* (2006.01)
*H01M 2/30* (2006.01)
*H01M 10/04* (2006.01)
*H01M 10/0525* (2010.01)
*H01M 10/0585* (2010.01)
*H01M 10/0587* (2010.01)

(52) U.S. Cl.
CPC ............. *H01M 2/06* (2013.01); *H01M 2/105* (2013.01); *H01M 2/30* (2013.01); *H01M 10/0422* (2013.01); *H01M 10/052* (2013.01); *H01M 10/0525* (2013.01); *H01M 10/0585* (2013.01); *H01M 10/0587* (2013.01); *H01M 10/613* (2015.04); *H01M 10/623* (2015.04); *H01M 10/654* (2015.04); *H01M 2220/30* (2013.01); *Y02T 10/7011* (2013.01)

(58) Field of Classification Search
USPC .......................................................... 429/94
See application file for complete search history.

(56) References Cited

U.S. PATENT DOCUMENTS

| | | |
|---|---|---|
| 5,501,916 A | 3/1996 | Teramoto et al. |
| 6,114,059 A | 9/2000 | Watanabe et al. |
| 2003/0113614 A1 | 6/2003 | Romero |
| 2010/0285341 A1* | 11/2010 | Yun .................... H01M 2/0275 429/94 |
| 2014/0065470 A1 | 3/2014 | Tsutsumi et al. |
| 2015/0044536 A1 | 2/2015 | Kwon et al. |
| 2015/0132637 A1 | 5/2015 | Tsutsumi |

FOREIGN PATENT DOCUMENTS

| | | |
|---|---|---|
| EP | 1321989 A2 | 6/2003 |
| JP | H06349460 A | 12/1994 |
| JP | H08250084 A | 9/1996 |
| JP | H10172582 A | 6/1998 |
| JP | H1173984 A | 3/1999 |
| JP | 2000285881 A * | 10/2000 |
| JP | 2000285881 A | 10/2000 |
| JP | 2002100343 A | 4/2002 |
| JP | 2004031129 A | 1/2004 |
| JP | 2005006064 A | 1/2005 |
| JP | 2011090830 A | 5/2011 |
| JP | 2013157158 A | 8/2013 |
| JP | 2014071972 A | 4/2014 |
| JP | 2014120469 A | 6/2014 |
| KR | 20060111841 A | 10/2006 |
| KR | 20090113430 A | 11/2009 |
| KR | 20100002633 A | 1/2010 |
| KR | 20130105272 A | 9/2013 |
| WO | 2012107161 A1 | 8/2012 |
| WO | 2013042640 A1 | 3/2013 |
| WO | 2014092031 A1 | 6/2014 |

* cited by examiner

[FIG. 1]
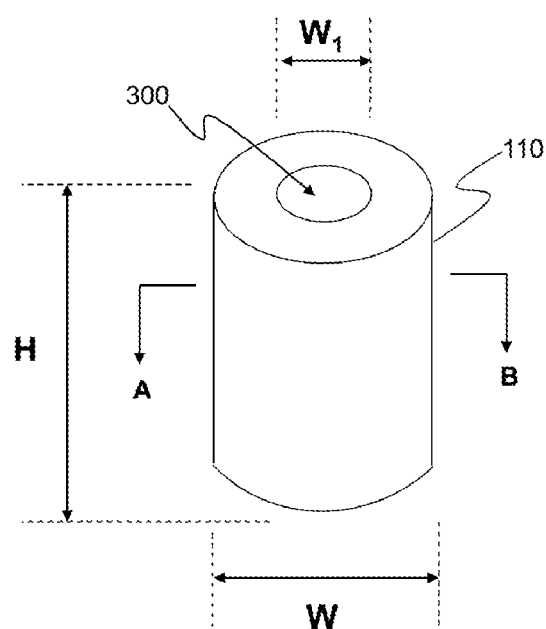

[FIG. 2]
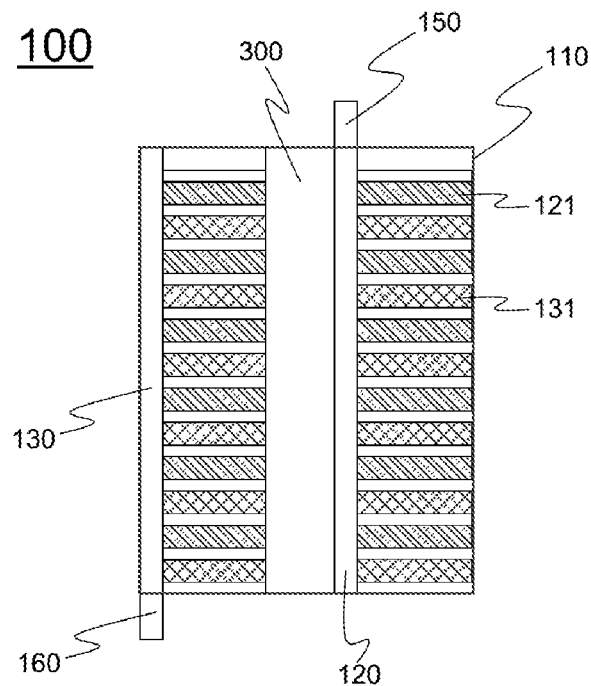
[FIG. 3]
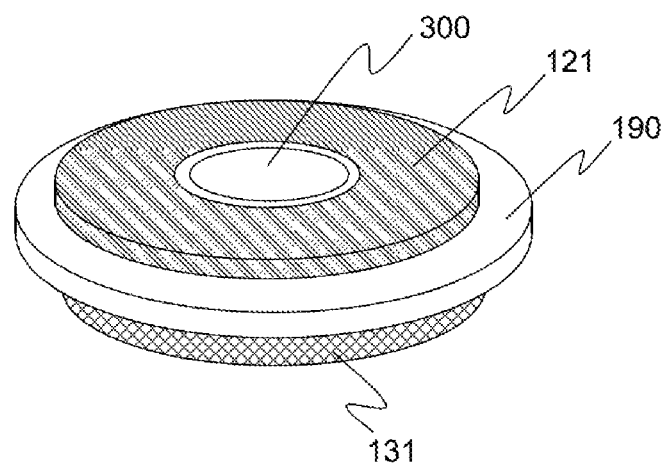

[FIG. 4]
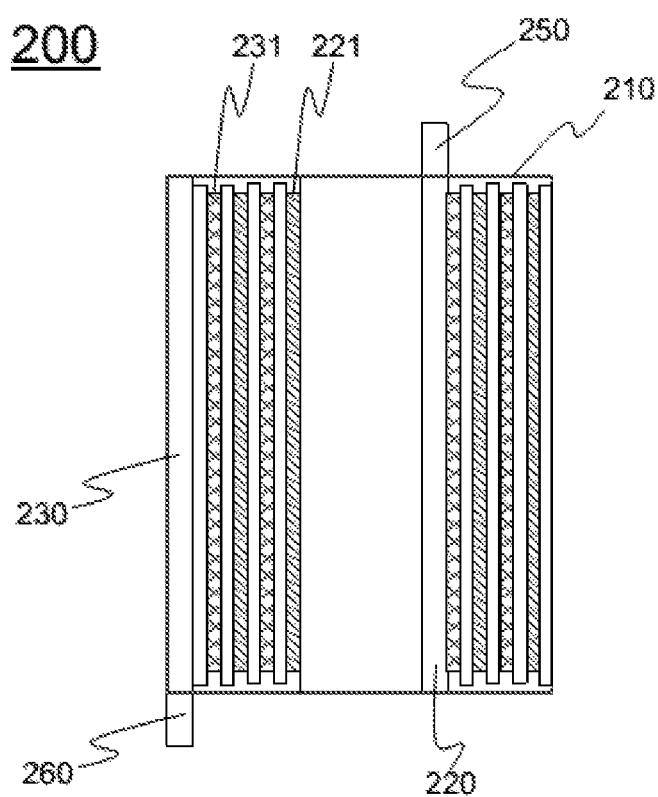

[FIG. 5]
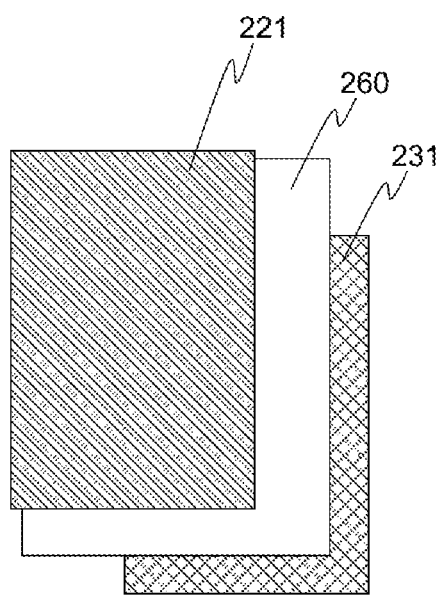

BATTERY CELL HAVING IMPROVED COOLING PERFORMANCE

CROSS-REFERENCE TO RELATED APPLICATION

This application is a national phase entry under 35 U.S.C. § 371 of International Application No. PCT/KR2015/007389, filed Jul. 16, 2015, which claims priority to Korean Patent Application No. 10-2014-0108718, filed Aug. 21, 2014, the disclosures of which are incorporated herein by reference.

TECHNICAL FIELD

The present invention relates to a battery cell having improved cooling performance.

BACKGROUND ART

As mobile devices have been increasingly developed and the demand for such mobile devices has increased, the demand for secondary batteries has also sharply increased as an energy source for the mobile devices. Among such secondary batteries is a lithium secondary battery having high energy density and discharge voltage, into which much research has been carried out and which is now commercially and widely used.

Based on the shape of a battery case, a secondary battery may be classified as a cylindrical battery having an electrode stack mounted in a cylindrical metal can, a prismatic battery having an electrode stack mounted in a prismatic metal can, or a pouch-shaped battery having an electrode stack mounted in a pouch-shaped battery case made of an aluminum laminate sheet. Thanks to the shape-related characteristics thereof, the cylindrical battery is used in various kinds of devices.

In general, the electrode stack mounted in the cylindrical battery functions as a power generating element having a positive electrode/separator/negative electrode stack structure that can be charged and discharged. The electrode stack mounted in the cylindrical battery is configured as a jelly-roll type electrode stack configured to have a structure in which a long sheet type positive electrode and a long sheet type negative electrode, to which active materials are applied, are wound around a core in the state in which a separator is disposed between the positive electrode and the negative electrode.

The jelly-roll type electrode stack has advantages in that it is possible to easily manufacture the jelly-roll type electrode stack and in that the jelly-roll type electrode stack has high energy density per unit weight.

In the case in which a middle or large-sized battery is manufactured using the cylindrical battery, however, it is difficult to discharge heat generated in the middle part of the cylindrical battery to the outside. When the cylindrical battery is repeatedly charged and discharged, therefore, the middle part of the cylindrical battery repeatedly heats up, with the result that the life span of the secondary battery may be reduced. Furthermore, the secondary battery may easily catch fire or explode.

Therefore, there is a high necessity for a cylindrical battery having improved cooling performance.

DISCLOSURE

Technical Problem

The present invention has been made to solve the above problems and other technical problems that have yet to be resolved.

It is an object of the present invention to provide a secondary battery configured to include an electrode stack having a hollow structure in which a hollow part is formed from the upper end to the lower end thereof and a battery case having a structure corresponding to that of the electrode stack, whereby heat circulation in the battery cell is smoothly carried out and the cooling efficiency is thus greatly improved.

In addition, it is another object of the present invention to provide a secondary battery configured to include an electrode stack extending in the vertical direction on the basis of the ground such that the electrode stack is relatively long in the vertical direction as compared with the area of each of the electrodes so as to uniformly restrain swelling of each of the electrodes of the electrode stack over the entire area of each of the electrodes and a battery case having a structure corresponding to that of the electrode stack, whereby swelling of the electrodes is effectively restrained and the performance of the battery is thus greatly improved.

Technical Solution

In accordance with one aspect of the present invention, the above and other objects can be accomplished by the provision of a battery cell having improved cooling performance, which is configured to have a structure in which an electrode stack, which is configured to have a structure in which positive electrodes and negative electrodes are stacked in the height direction on the basis of the ground in the state in which separators are disposed respectively between the positive electrodes and the negative electrodes, is mounted in a battery case in a sealed state, the battery case is formed in a pipe shape having a hollow part, and the electrode stack is formed in a shape corresponding to the shape of the battery case.

Consequently, coolant may flow along the outside of the battery cell and through the hollow part of the battery cell, with the result that heat circulation is smoothly carried out, whereby it is possible to effectively remove heat from the battery.

In a concrete example, the electrode stack may be configured to have a structure in which the length of the electrode stack in the height direction (i.e. the major axis), which is a stacked direction of the electrode stack, on the basis of the ground is greater than the length of the electrode stack in the width direction (i.e. the minor axis) perpendicular to the height direction.

That is, the battery cell having improved cooling performance according to the present invention may be configured to include an electrode stack extending in the vertical direction on the basis of the ground such that the electrode stack is relatively long in the vertical direction as compared with the area of each of the electrodes so as to uniformly restrain swelling of each of the electrodes of the electrode stack over the entire area of each of the electrodes and a battery case having a structure corresponding to that of the electrode stack. Consequently, swelling of the electrodes is effectively restrained.

The size of the hollow part of the battery cell may be set in consideration of the volume of the battery cell and the amount of heat that is generated in the battery cell. For example, the size of the hollow part of the battery cell may be 5% to 80% of the upper sectional area of the battery case.

The material for the battery case is not particularly restricted as long as the material for battery case exhibits high thermal and electrical conductivity. Specifically, the battery case may be made of any one selected from a group consisting of stainless steel (SUS), nickel, copper (Cu), and aluminum (Al).

In a concrete example, the battery cell may be configured to have a structure in which the battery case is provided at one end or opposite ends thereof with external input/output terminals, which protrude from one end or opposite ends of the battery case.

In the above structure, the battery cell may include a positive electrode connection member for connecting the positive electrodes of the electrode stack to the positive electrode input/output terminal and a negative electrode connection member for connecting the negative electrodes of the electrode stack to the negative electrode input/output terminal. In addition, the positive electrode connection member and the negative electrode connection member may be disposed in the battery case.

In this case, the positive electrode connection member and the negative electrode connection member are disposed in a space defined between the outside of the electrode stack and the inside of the battery case.

In a concrete example, the positive electrode connection member and the negative electrode connection member may each be made of a metal sheet, and the metal sheet may be disposed in a direction that faces the outside of the electrode stack.

In addition, the battery case may be made of a laminate sheet comprising a resin layer and a metal layer. For example, the battery case may be a metal case made of a metal material that exhibits high strength and electrical conductivity. However, the present invention is not limited thereto.

That is, according to the present invention, the negative electrode connection member is made of a metal sheet according to circumstances. Consequently, the battery case may be made of a polymer material, such as plastic. As compared with a conventional structure in which the battery case is used as the negative electrode, therefore, the battery case may be made of an insulative material, such as a polymer material. Consequently, it is possible to form the battery case in various shapes, to reduce material costs, and to improve the insulativity of the battery case.

The electrode stack according to the present invention may be configured to have a jelly-roll type structure, a stacked type structure, a stacked/folded type structure, or a laminated/stacked type structure.

Hereinafter, the jelly-roll type structure, the stacked type structure, the stacked/folded type structure, and the laminated/stacked type structure will be described in detail.

First, the jelly-roll type structure electrode stack may be manufactured by coating a metal foil, which is used as a current collector, with an electrode material mixture, drying and pressing the metal foil, cutting the metal foil in the form of a band having a predetermined width and length to form a positive electrode plate and a negative electrode plate, stacking the positive electrode plate and the negative electrode plate in the state in which a separator is disposed between the positive electrode plate and the negative electrode plate, and winding the stacked positive electrode plate, the separator, and the negative electrode plate in a spiral fashion.

The stacked type electrode stack may be manufactured by coating each metal current collector with an electrode material mixture, drying and pressing the metal current collector, cutting the metal current collector to a predetermined size to form a positive electrode plate and a negative electrode plate, and stacking the positive electrode plate and the negative electrode plate in the state in which a separator, which is cut to a predetermined size corresponding to the positive electrode plate and the negative electrode plate, is disposed between the positive electrode plate and the negative electrode plate.

The stacked/folded type electrode stack may be manufactured by folding two or more unit cells, each of which is configured to have a structure in which two or more electrode plates are stacked such that a positive electrode and a negative electrode face each other, using one or more separation films in the state in which the unit cells do not overlap or by bending a separation film into the size of each of the unit cells and disposing the bent separation film between the unit cells.

The laminated/stacked type electrode stack may be manufactured by coating each metal current collector with an electrode material mixture, drying and pressing the metal current collector, cutting the metal current collector to a predetermined size, and sequentially stacking a negative electrode, a separator, a positive electrode, and a separator from below.

The electrode stack may be configured to have any of various shapes. For example, the electrode stack may be configured to have a circular, oval, or polygonal shape in horizontal section.

According to circumstances, the electrode stack may be configured to have a rectangular or square shape in horizontal section.

In addition, the kind of the battery cell according to the present invention is not particularly restricted as long as the electrode stack described above is mounted in the battery case. In a concrete example, the battery cell may be a lithium secondary battery that exhibits high energy density, discharge voltage, and output stability.

The composition, structure, and manufacturing method of the battery cell, including the lithium secondary battery, are obvious to a person having ordinary skill in the art to which the present invention pertains, and therefore a detailed description thereof will be omitted.

In accordance with other aspects of the present invention, there are provided a battery pack including one or more battery cells and a device that uses the battery pack as a power source. Specifically, the device may be selected from a group consisting of a laptop computer, a mobile phone, a portable display player (PDP), a portable multimedia player (PMP), an MP3 player, a digital still camera (DSC), a digital video recorder (DVR), a smartphone, a global positioning system (GPS), a camcorder, an electric vehicle, a hybrid electric vehicle, a plug-in hybrid electric vehicle, and a power storage apparatus.

The above-mentioned devices and apparatuses are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a perspective view showing a battery cell according to an embodiment of the present invention;

FIG. 2 is a vertical sectional view taken along line A-B of FIG. 1;

FIG. 3 is a perspective view showing a unit cell constituting an electrode stack according to an embodiment of the present invention;

FIG. 4 is a vertical sectional view showing a battery cell according to another embodiment of the present invention; and FIG. 5 is a perspective view showing a unit cell constituting an electrode stack shown in FIG. 4.

BEST MODE

Now, exemplary embodiments of the present invention will be described in detail with reference to the accompanying drawings. It should be noted, however, that the scope of the present invention is not limited by the illustrated embodiments.

FIG. 1 is a perspective view schematically showing a battery cell according to an embodiment of the present invention, FIG. 2 is a vertical sectional view taken along line A-B of FIG. 1, and FIG. 3 is a perspective view schematically showing a unit cell constituting an electrode stack according to an embodiment of the present invention.

Referring to these figures, the battery cell includes an electrode stack 100 including a plurality of stacked unit cells 170 and a battery case 110 in which the electrode stack 100 is mounted in a sealed state.

The battery case 110 is formed in the shape of a pipe having a hollow part 300 defined in the middle region thereof. The electrode stack 100 is formed in a shape corresponding to that of the battery case 110.

The electrode stack 100 is formed in the sectional shape of a doughnut having a hollow part 300 such that the electrode stack 100 can be easily inserted into the battery case 110. Specifically, the electrode stack 100 is configured to have a structure in which the unit cells 170, each of which includes a doughnut-shaped positive electrode 121, a doughnut-shaped negative electrode 131, and a doughnut-shaped separator 190, are sequentially stacked upward on the basis of the ground. The battery case 110 is provided at opposite ends thereof with external input/output terminals 150 and 160, which protrude from the opposite ends of the battery case 110.

A positive electrode lead 120 for connecting the positive electrodes 121 of the electrode stack 100 to the positive electrode input/output terminal 150 and a negative electrode lead 130 for connecting the negative electrodes 131 of the electrode stack 100 to the negative electrode input/output terminal 160 are provided in a space defined between the outside of the electrode stack 100 and the inside of the battery case 110. Specifically, the positive electrode input/output terminal 150 is provided in the hollow part 300. As a result, the distance between the positive electrode input/output terminal 150 and the negative electrode input/output terminal 160, which is formed on the outside of the electrode stack 100 is reduced or minimized, as compared with that of a battery cell having no hollow part 300, thereby improving the efficiency of the battery.

The length of the electrode stack 100 in the direction in which the electrode stack is vertically stacked is greater than that of the electrode stack 100 in the horizontal direction on the basis of the ground. In the same manner, the battery case 110 is formed in the shape of a pipe corresponding to the electrode stack 100 such that the electrode stack 100 can be easily mounted in the battery case 110. Specifically, the battery case 110 is configured to have a structure in which a length in the height direction H is about twice a length in the width direction W. The size of the hollow part 300 is about 50% that of the upper sectional area of the battery case 110.

Since the hollow part is formed in the electrode stack and the hollow part is also formed in the middle region of the battery case, internal heat circulation is smoothly carried out, thereby improving cooling efficiency. Even when the electrodes in the battery swell, therefore, swelling surfaces of the electrodes contact and press each other. Furthermore, the electrodes are constrained in a battery case having a size corresponding to the outside of the electrode stack. Consequently, it is possible to effectively restrain an electrode swelling phenomenon.

FIG. 4 is a vertical sectional view showing a battery cell according to another embodiment of the present invention, and FIG. 5 is a perspective view schematically showing a unit cell constituting an electrode stack shown in FIG. 4.

The battery cell shown in FIGS. 4 and 5 are identical in structure to the battery cell shown in FIGS. 1 and 2 except that unit cells 270, each of which includes a positive electrode 221, a negative electrode 231, and a separator 260, are sequentially stacked and are wound to constitute a jelly-roll type electrode stack, which is mounted in a battery case 210, and therefore a detailed description thereof will be omitted.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery cell having improved cooling performance according to the present invention is configured to include an electrode stack having a hollow structure in which a hollow part is formed from the upper end to the lower end thereof and a battery case having a structure corresponding to that of the electrode stack. Consequently, heat circulation in the battery cell is smoothly carried out, thereby greatly improving cooling efficiency.

In addition, the battery cell having improved cooling performance according to the present invention is configured to include an electrode stack extending in the vertical direction on the basis of the ground such that the electrode stack is relatively long in the vertical direction as compared with the area of each of the electrodes so as to uniformly restrain swelling of each of the electrodes of the electrode stack over the entire area of each of the electrodes and a battery case having a structure corresponding to that of the electrode stack. Consequently, swelling of the electrodes is effectively restrained, thereby greatly improving the performance of the battery.

The invention claimed is:

1. A battery cell configured to have a structure in which an electrode stack, which is configured to have a structure in which positive electrodes and negative electrodes are stacked in a height direction on a basis of a ground in a state in which separators are disposed respectively between the positive electrodes and the negative electrodes, is mounted in a battery case in a sealed state, the battery case is formed in a pipe shape having a hollow part, the battery case having a top surface and a bottom surface opposite the top surface, the hollow part extending completely through the battery case and completely through the top and bottom surfaces, and the electrode stack is formed in a shape corresponding to the shape of the battery case, wherein the battery cell has a positive electrode input/output terminal and a negative electrode input/output terminal protruding from opposite ends of the battery case.

2. A battery cell configured to have a structure in which an electrode stack, which is configured to have a structure in which positive electrodes and negative electrodes are stacked in a height direction on a basis of a ground in a state in which separators are disposed respectively between the positive electrodes and the negative electrodes, is mounted in a battery case in a sealed state, the battery case is formed in a pipe shape having a hollow part, and the electrode stack is formed in a shape corresponding to the shape of the battery case, wherein the electrode stack is configured to have a structure in which a length of the electrode stack in a height direction (i.e. a major axis), which is a stacked direction of the electrode stack, on the basis of the ground is greater than a length of the electrode stack in a width direction (i.e. a minor axis) perpendicular to the height direction.

3. A battery cell configured to have a structure in which an electrode stack, which is configured to have a structure in which positive electrodes and negative electrodes are stacked in a height direction on a basis of a ground in a state in which separators are disposed respectively between the positive electrodes and the negative electrodes, is mounted in a battery case in a sealed state, the battery case is formed in a pipe shape having a hollow part, and the electrode stack is formed in a shape corresponding to the shape of the battery case, wherein the hollow part has a size equivalent to 5% to 80% of an upper sectional area of the battery case.

4. The battery cell according to claim 1, wherein the battery case is made of any one selected from a group consisting of stainless steel (SUS), nickel, copper (Cu), and aluminum (Al).

5. The battery cell according to claim 1, wherein the battery cell is configured to have a structure in which the battery case is provided at one end or opposite ends thereof with external input/output terminals, which protrude from one end or opposite ends of the battery case.

6. The battery cell according to claim 5, wherein the battery cell comprises a positive electrode connection member for connecting the positive electrodes of the electrode stack to a positive electrode input/output terminal and a negative electrode connection member for connecting the negative electrodes of the electrode stack to a negative electrode input/output terminal.

7. The battery cell according to claim 6, wherein the positive electrode connection member and the negative electrode connection member are disposed in the battery case.

8. The battery cell according to claim 7, wherein the positive electrode connection member and the negative electrode connection member are disposed in a space defined between an outside of the electrode stack and an inside of the battery case.

9. The battery cell according to claim 8, wherein the positive electrode connection member and the negative electrode connection member are each made of a metal sheet, and the metal sheet is disposed in a direction that faces the outside of the electrode stack.

10. The battery cell according to claim 1, wherein the battery case is made of a laminate sheet comprising a resin layer and a metal layer.

11. The battery cell according to claim 1, wherein the battery case is made of metal or plastic.

12. The battery cell according to claim 1, wherein the electrode stack is configured to have a jelly-roll type structure, a stacked type structure, a stacked/folded type structure, or a laminated/stacked type structure.

13. The battery cell according to claim 1, wherein the electrode stack is configured to have a circular, oval, or polygonal shape in horizontal section.

14. The battery cell according to claim 1, wherein a sheathing film is attached to an outside of the battery case.

15. The battery cell according to claim 1, wherein the battery cell is a lithium secondary battery.

16. A battery pack comprising one or more battery cells according to claim 1.

17. A device using a battery pack according to claim 16 as a power source.

18. The device according to claim 17, wherein the device is selected from a group consisting of a laptop computer, a mobile phone, a portable display player (PDP), a portable multimedia player (PMP), an MP3 player, a digital still camera (DSC), a digital video recorder (DVR), a smartphone, a global positioning system (GPS), a camcorder, an electric vehicle, a hybrid electric vehicle, a plug-in hybrid electric vehicle, and a power storage apparatus.

* * * * *